United States Patent
Chen et al.

(10) Patent No.: US 8,797,922 B2
(45) Date of Patent: Aug. 5, 2014

(54) HANDLING AMBIGUOUS RELAY PHYSICAL DOWNLINK CONTROL CHANNEL (R-PDCCH) DECODING FOR A RELAY NODE

(75) Inventors: Wanshi Chen, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 13/215,898

(22) Filed: Aug. 23, 2011

(65) Prior Publication Data

US 2012/0051270 A1    Mar. 1, 2012

Related U.S. Application Data

(60) Provisional application No. 61/376,571, filed on Aug. 24, 2010.

(51) Int. Cl.
*H04W 72/04* (2009.01)

(52) U.S. Cl.
USPC ........... 370/279; 370/329; 370/470; 370/241; 455/450; 455/269

(58) Field of Classification Search
CPC ..... H04L 5/0053; H04L 5/001; H04L 1/1887; H04L 2001/125; H04L 5/003; H04L 5/0055; H04W 28/04; H04W 28/06; H04W 72/04; H04W 84/047; H04W 72/00
USPC ................. 370/329, 470, 242, 312–315, 241; 375/295, 316, 224, 260, 269, 211; 455/450, 423

See application file for complete search history.

(56) References Cited

U.S. PATENT DOCUMENTS

| | | | |
|---|---|---|---|
| 2009/0257449 A1* | 10/2009 | Chen et al. | 370/470 |
| 2010/0317360 A1* | 12/2010 | McBeath et al. | 455/450 |
| 2011/0103509 A1* | 5/2011 | Chen et al. | 375/295 |
| 2011/0199985 A1* | 8/2011 | Cai et al. | 370/329 |
| 2011/0243090 A1* | 10/2011 | Grovlen et al. | 370/329 |
| 2012/0039179 A1* | 2/2012 | Seo et al. | 370/241 |
| 2012/0039285 A1* | 2/2012 | Seo et al. | 370/329 |
| 2012/0113941 A1* | 5/2012 | Chung et al. | 370/329 |
| 2012/0155561 A1* | 6/2012 | Seo et al. | 375/260 |
| 2012/0163437 A1* | 6/2012 | Frederiksen et al. | 375/224 |

OTHER PUBLICATIONS

QUALCOMM Incorporated, On Ambiguous R-PDCCH Aggregation Levels in Multiplexing R-PDCCH with UN PDSCH, R1-110929, 3GPP TSG RAN WG1 #64, Feb. 21-25, 2011, pp. 1-4, XP002663734.

(Continued)

*Primary Examiner* — Dang Ton
*Assistant Examiner* — Sai Aung
(74) *Attorney, Agent, or Firm* — Patterson & Sheridan, L.L.P.

(57) ABSTRACT

In a relay system, a relay node (RN) may communicate with a donor base station (BS) via a backhaul link. For example, the RN may receive control information from the donor BS over the backhaul link. The control information may be transmitted by the donor BS using a specific aggregation level. The RN may decode the control information by monitoring search spaces associated with various aggregation levels. When two or more search spaces are overlapped, decoding candidates of different aggregation levels of the same starting control channel element (CCE) index may result in a successful control information decoding, when actual control information transmission may use only one of the aggregation levels. Such a possibility may result in ambiguous decoding of the control information. Certain aspects of the present disclosure generally relate to handling the ambiguous decoding.

66 Claims, 10 Drawing Sheets

(56) References Cited

OTHER PUBLICATIONS

QUALCOMM Incorporated, On Ambiguous R-PDCCH Aggregation Levels in Multiplexing R-PDCCH with Un PDSCH, R1-106379, 3GPP TSG RAN WG1 #63, Nov. 15-19, 2010, pp. 1-3, XP002663735.

Nokia, Nokia Siemens Networks, "Discussion on R-PDCCH Search Space Design," R1-103815, 3GPP TSG-RAN WG1 Meeting #61bis, Jun. 28-Jul. 2, 2010, 3 pages, XP050449236.

QUALCOMM Europe, "Additional Details on Confusing Multiple PDCCH Aggregation Levels," R1-083169, 3GPP TSG-RAN WG1 #54, Aug. 18-22, 2008, XP050316603.

QUALCOMM Europe, "Confusing Multiple PDCCH Aggregation Levels," R1-082544, 3GPP TSG-RAN WG1 #53bis, Jun. 30-Jul. 4, 2008, pp. 1-7, XP050110806.

International Search Report and Written Opinion for International Patent Application No. PCT/US2011/048984, dated Nov. 30, 2011.

* cited by examiner

HANDLING AMBIGUOUS RELAY PHYSICAL DOWNLINK CONTROL CHANNEL (R-PDCCH) DECODING FOR A RELAY NODE

CROSS-REFERENCE TO RELATED APPLICATION(S)

This application claims benefit of U.S. Provisional Patent Application Ser. No. 61/376,571, filed Aug. 24, 2010, which is herein incorporated by reference.

BACKGROUND

1. Field

Certain aspects of the disclosure generally relate to wireless communications and, more particularly, to handling ambiguous Relay Physical Downlink Control Channel (R-PDCCH) decoding for a relay node.

2. Background

Wireless communication systems are widely deployed to provide various types of communication services such as voice, video, packet data, messaging, broadcast, etc. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, $3^{rd}$ Generation Partnership Project (3GPP) Long Term Evolution (LTE) networks, and Long Term Evolution Advanced (LTE-A) networks.

A wireless communication network may include a number of base stations that can support communication with a number of user equipment devices (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE. This communication link may be established via a single-input single-output, multiple-input single-output or a multiple-input multiple-output (MIMO) system.

Wireless communication systems may comprise a donor base station that communicates with wireless terminals via a relay node, such as a relay base station. The relay node may communicate with the donor base station via a backhaul link and with the terminals via an access link. In other words, the relay node may receive downlink messages from the donor base station over the backhaul link and relay these messages to the terminals over the access link. Similarly, the relay node may receive uplink messages from the terminals over the access link and relay these messages to the donor base station over the backhaul link. The relay node may, thus, be used to supplement a coverage area and help fill "coverage holes."

SUMMARY

Certain aspects of the present disclosure provide a method for wireless communications. The method generally includes determining a set of decoding candidates for each of a plurality of aggregation levels for control information transmission to a node; determining a set of ambiguous decoding candidates across the set of decoding candidates for each of the plurality of aggregation levels, wherein a first decoding candidate of aggregation level m is in the set of ambiguous decoding candidates if there is at least a second decoding candidate of aggregation level n, wherein m is not equal to n, which has a same starting control channel element (CCE) index as the first decoding candidate; transmitting control information to the node using the first decoding candidate; and assigning downlink (DL) resources for data transmission corresponding to the control information, wherein the assigned DL resources are based on the first decoding candidate and the set of ambiguous decoding candidates.

Certain aspects of the present disclosure provide an apparatus for wireless communications. The apparatus generally includes means for determining a set of decoding candidates for each of a plurality of aggregation levels for control information transmission to a node; means for determining a set of ambiguous decoding candidates across the set of decoding candidates for each of the plurality of aggregation levels, wherein a first decoding candidate of aggregation level m is in the set of ambiguous decoding candidates if there is at least a second decoding candidate of aggregation level n, wherein m is not equal to n, which has a same starting control channel element (CCE) index as the first decoding candidate; means for transmitting control information to the node using the first decoding candidate; and means for assigning downlink (DL) resources for data transmission corresponding to the control information, wherein the assigned DL resources are based on the first decoding candidate and the set of ambiguous decoding candidates.

Certain aspects of the present disclosure provide an apparatus for wireless communications. The apparatus generally includes at least one processor configured to determine a set of decoding candidates for each of a plurality of aggregation levels for control information transmission to a node; determine a set of ambiguous decoding candidates across the set of decoding candidates for each of the plurality of aggregation levels, wherein a first decoding candidate of aggregation level m is in the set of ambiguous decoding candidates if there is at least a second decoding candidate of aggregation level n, wherein m is not equal to n, which has a same starting control channel element (CCE) index as the first decoding candidate; transmit control information to the node using the first decoding candidate; and assign downlink (DL) resources for data transmission corresponding to the control information, wherein the assigned DL resources are based on the first decoding candidate and the set of ambiguous decoding candidates; and a memory coupled with the at least one processor.

Certain aspects of the present disclosure provide a computer program product for wireless communications comprising a computer readable medium having instructions stored thereon. The instructions are generally executable by one or more processors for determining a set of decoding candidates for each of a plurality of aggregation levels for control information transmission to a node; determining a set of ambiguous decoding candidates across the set of decoding candidates for each of the plurality of aggregation levels, wherein a first decoding candidate of aggregation level m is in the set of ambiguous decoding candidates if there is at least a second decoding candidate of aggregation level n, wherein m is not equal to n, which has a same starting control channel element (CCE) index as the first decoding candidate; transmitting control information to the node using the first decoding candidate; and assigning downlink (DL) resources for data transmission corresponding to the control information, wherein the assigned DL resources are based on the first decoding candidate and the set of ambiguous decoding candidates.

Certain aspects of the present disclosure provide a method for wireless communications. The method generally includes decoding, at a node, control information using a first decoding candidate of aggregation level m; and accepting an assignment of downlink (DL) resources for data transmission corresponding to the control information, wherein the assignment of DL resources are based on the first decoding candidate and a set of ambiguous decoding candidates, wherein the first decoding candidate is in the set of ambiguous decoding candidates if there is at least a second decoding candidate of aggregation level n, wherein m is not equal to n, which has a same starting control channel element (CCE) index as the first decoding candidate.

Certain aspects of the present disclosure provide an apparatus for wireless communications. The apparatus generally includes means for decoding, at a node, control information using a first decoding candidate of aggregation level m; and means for accepting an assignment of downlink (DL) resources for data transmission corresponding to the control information, wherein the assignment of DL resources are based on the first decoding candidate and a set of ambiguous decoding candidates, wherein the first decoding candidate is in the set of ambiguous decoding candidates if there is at least a second decoding candidate of aggregation level n, wherein m is not equal to n, which has a same starting control channel element (CCE) index as the first decoding candidate.

Certain aspects of the present disclosure provide an apparatus for wireless communications. The apparatus generally includes at least one processor configured to decode, at a node, control information using a first decoding candidate of aggregation level m; and accept an assignment of downlink (DL) resources for data transmission corresponding to the control information, wherein the assignment of DL resources are based on the first decoding candidate and a set of ambiguous decoding candidates, wherein the first decoding candidate is in the set of ambiguous decoding candidates if there is at least a second decoding candidate of aggregation level n, wherein m is not equal to n, which has a same starting control channel element (CCE) index as the first decoding candidate; and a memory coupled with the at least one processor.

Certain aspects of the present disclosure provide a computer program product for wireless communications comprising a computer readable medium having instructions stored thereon. The instructions are generally executable by one or more processors for decoding, at a node, control information using a first decoding candidate of aggregation level m; and accepting an assignment of downlink (DL) resources for data transmission corresponding to the control information, wherein the assignment of DL resources are based on the first decoding candidate and a set of ambiguous decoding candidates, wherein the first decoding candidate is in the set of ambiguous decoding candidates if there is at least a second decoding candidate of aggregation level n, wherein m is not equal to n, which has a same starting control channel element (CCE) index as the first decoding candidate.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Figure 1:
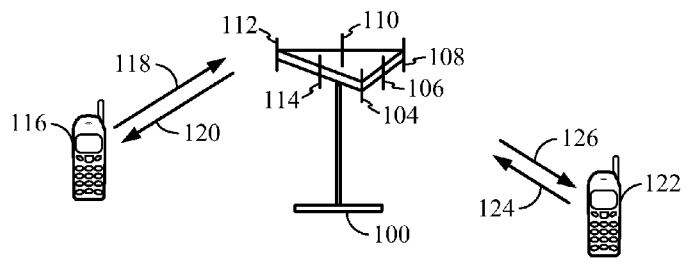
FIG. 1 illustrates an example wireless communication system according to an aspect of the present disclosure.

In a relay system, a relay node (RN) may communicate with a donor base station (BS) via a backhaul link. For example, the RN may receive control information from the donor BS over the backhaul link. The control information may be transmitted by the donor BS using a specific aggregation level. The RN may decode the control information by monitoring search spaces associated with various aggregation levels. When two or more search spaces are overlapped, decoding candidates of different aggregation levels of the same starting control channel element (CCE) index may result in successful control information decoding, when actual control information transmission may use only one of the aggregation levels. Such a possibility may result in ambiguous decoding of the control information. Certain aspects of the present disclosure generally relate to handling the ambiguous decoding.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

An Example Wireless Communication System

Referring to FIG. 1, a multiple access wireless communication system according to one embodiment is illustrated. Access point 100 (AP) includes multiple antenna groups, one including antenna 104 and antenna 106, another including antenna 108 and antenna 110, and yet another including antenna 112 and antenna 114. In FIG. 1, only two antennas are shown for each antenna group; however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect, antenna groups each are designed to communicate to access terminals in a sector, of the areas covered by access point 100.

In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point (AP) may be a fixed station used for communicating with the terminals and may also be referred to as a base station (BS), a Node B, or some other terminology. An access terminal may also be called a mobile station (MS), user equipment (UE), a wireless communication device, terminal, user terminal (UT), or some other terminology.

Figure 2:
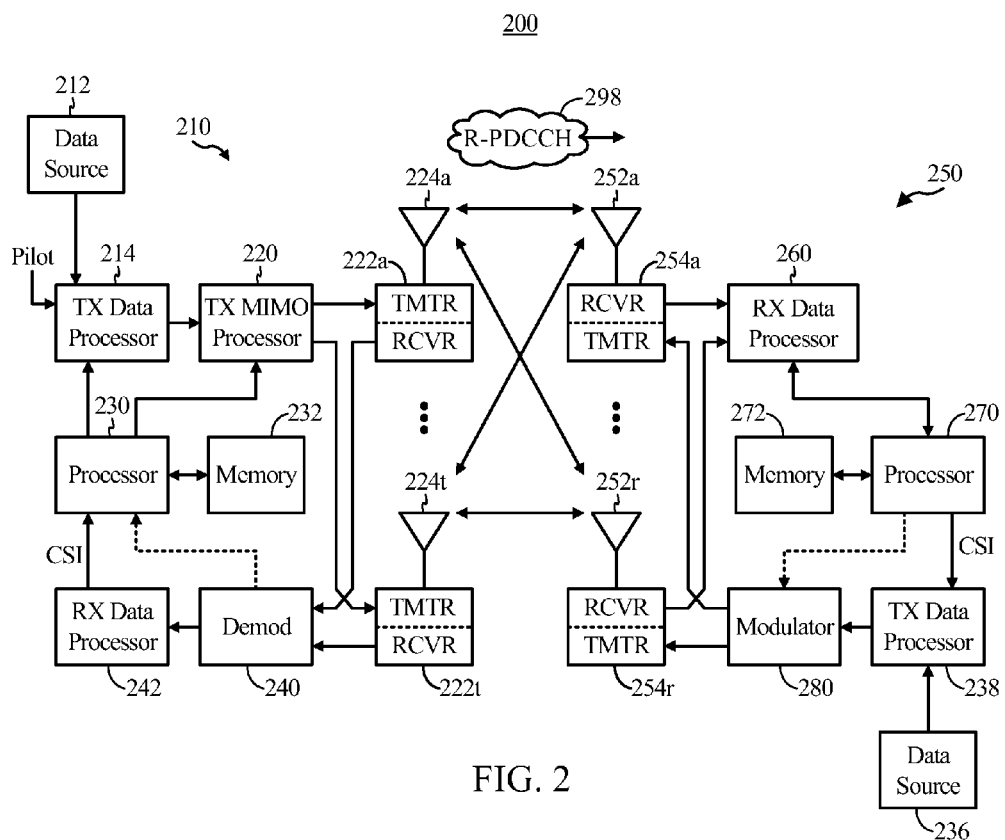
FIG. 2 is a block diagram conceptually illustrating an example of a Node B in communication with a user equipment device (UE) in a wireless communication system, according to an aspect of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively. The transmitted modulated signals may indicate control information for a relay node, such as a Relay Physical Downlink Control Channel (R-PDCCH) 298, as illustrated in FIG. 2.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+ MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control—
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DL-SCH DownLink Shared CHannel
DM-RS DeModulation-Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User—
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multimedia Broadcast Single Frequency Network
MCE MBMS Coordinating Entity
MCH Multicast CHannel
MSCH MBMS Control CHannel
PDCCH Physical Downlink Control CHannel
PDSCH Physical Downlink Shared CHannel
PRB Physical Resource Block
VRB Virtual Resource Block
In addition, Rel-8 refers to Release 8 of the LTE standard.

An Example Relay System

Figure 3:
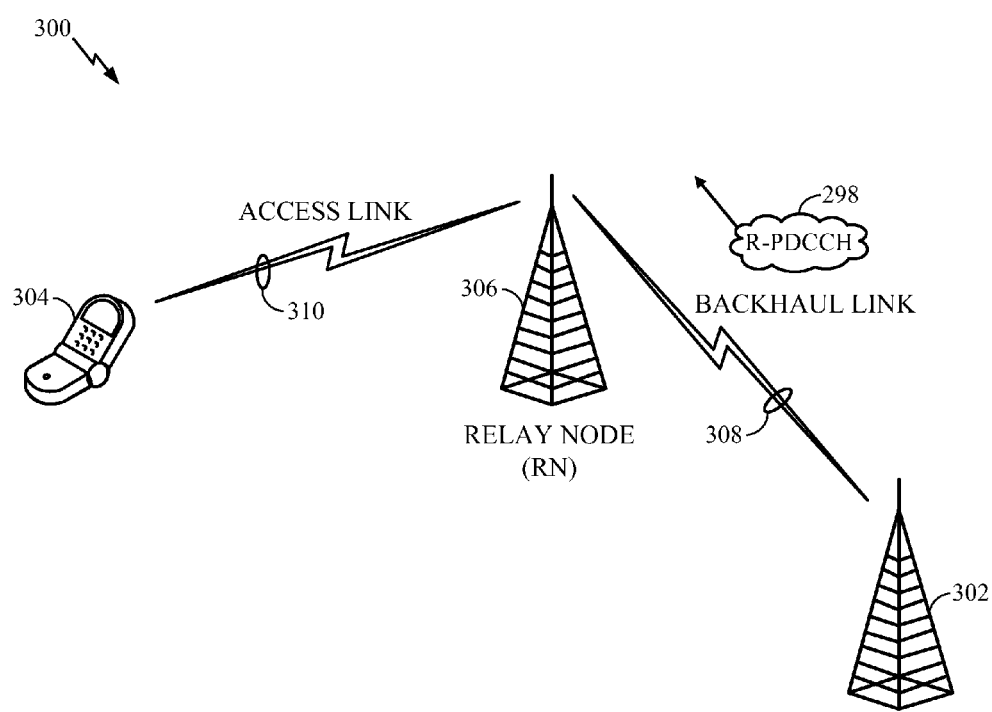
FIG. 3 illustrates an example wireless communications system with a relay node according to an aspect of the present disclosure.

FIG. 3 illustrates an example wireless system 300 in which certain aspects of the present disclosure may be practiced. As illustrated, the system 300 includes a donor base station (BS) 302 (also known as donor access point or a donor evolved Node B (DeNB)) that communicates with a user equipment (UE) 304 via a relay node 306 (also known as a relay station or a relay).

The relay node 306 may communicate with the donor BS 302 via a backhaul link 308 and with the UE 304 via an access link 310. In other words, the relay node 306 may receive downlink messages from the donor BS 302 over the backhaul link 308 and relay these messages to the UE 304 over the access link 310. Similarly, the relay node 306 may receive uplink messages from the UE 304 over the access link 310 and relay these messages to the donor BS 302 over the backhaul link 308.

The relay node 306 may, thus, be used to supplement a coverage area and help fill "coverage holes." According to certain aspects, a relay node 306 may appear to a UE 304 as a conventional BS. According to other aspects, certain types of UEs may recognize a relay node as such, which may enable certain features.

Handling Ambiguous R-PDCCH Decoding for A Relay Node

A relay node 306 may not be able to receive normal PDCCH from a donor BS 302. In this case, the donor BS may transmit a Relay Physical Downlink Control Channel (R-PDCCH) 298 via the backhaul link 308. The R-PDCCH 298 may be transmitted as a Multimedia Broadcast Single Frequency Network (MBSFN) subframe. The R-PDCCH is designed to dynamically or semi-persistently assign resources for the downlink backhaul data (e.g., Physical Downlink Shared Channel (PDSCH) for a relay node (R-PDSCH) and Physical Uplink Shared Channel (PUSCH) for a relay node (R-PUSCH)).

Figure 4:
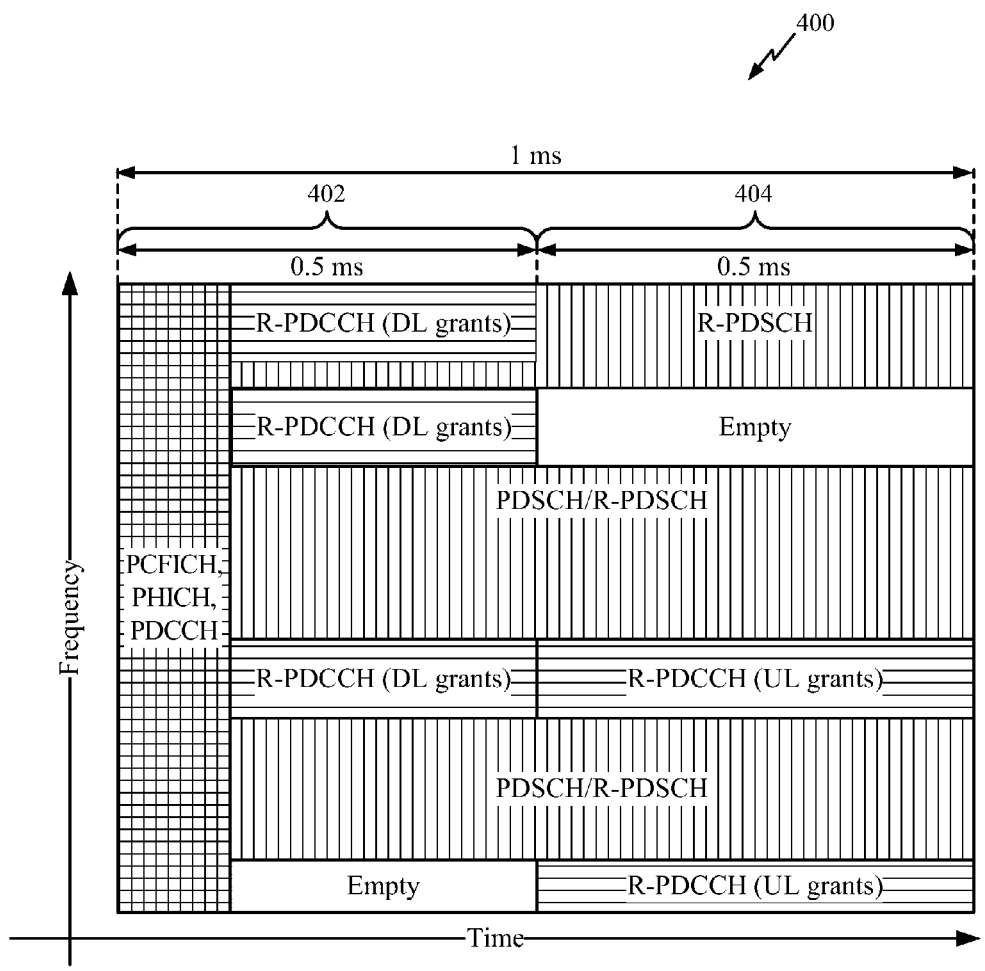
FIG. 4 illustrates an example Relay Physical Downlink Control Channel (R-PDCCH) subframe according to an aspect of the present disclosure.

FIG. 4 illustrates an example backhaul subframe 400 according to an aspect of the present disclosure. The backhaul subframe 400 is divided into a first slot 402 and a second slot 404, wherein each slot typically comprises 7 symbols in LTE for the normal cyclic prefix (CP) case. Each subframe in LTE spans 1 ms, and therefore, each slot has a duration of 0.5 ms. The first 3 symbols of the backhaul subframe 400 may be used for the Physical Control Format Indicator Channel (PCFICH), the Physical HARQ Indicator Channel (PHICH), and the normal (i.e., non-relay) PDCCH.

Various options are available for conveying information in the backhaul subframe 400. For example, DL grants are transmitted in the first slot 402. If a DL grant is transmitted in the first physical resource block (PRB) of a given PRB pair, then a UL grant may be transmitted in the second PRB of the PRB pair for certain aspects. For other aspects, data (e.g., R-PDSCH data) may be transmitted in the second slot 404 of an R-PDCCH PRB pair (i.e., multiplexed), or the second slot 404 may be empty. The multiplexing may only be possible for DL grants with the R-PDSCH data. In other words, UL grants may not be multiplexed with the R-PDSCH data.

In LTE Rel-8, PDCCH demodulation is based on common reference signals (CRSs). Each UE monitors two types of search spaces: common and UE-specific. As a result, up to 22 PDCCH decoding candidates may be possible. For each PDCCH decoding candidate, there are two distinct Downlink Control Information (DCI) sizes resulting in a maximum of 44 blind decodes. Each PDCCH may be transmitted using a specific aggregation level, where Control Channel Elements (CCEs) (comprising nine resource element groups (REGs), which is equal to 36 REs) may be the minimum unit.

For the common search space, two aggregation levels may be supported, for example, 4 (CCEs) and 8, with 4 and 2 decoding candidates, respectively. For the UE-specific search space, four aggregation levels may be supported, for example, 1, 2, 4, and 8, with 6, 6, 2, and 2 decoding candidates, respectively. Each search space may follow the so-called "tree-structure," where the starting CCE for each aggregation level may be an integer multiple of the corresponding level. The starting CCE index for a UE may be randomly derived by a certain "hashing function." Search spaces of different aggregation levels for a UE may overlap, as will be discussed further herein.

Figure 5:
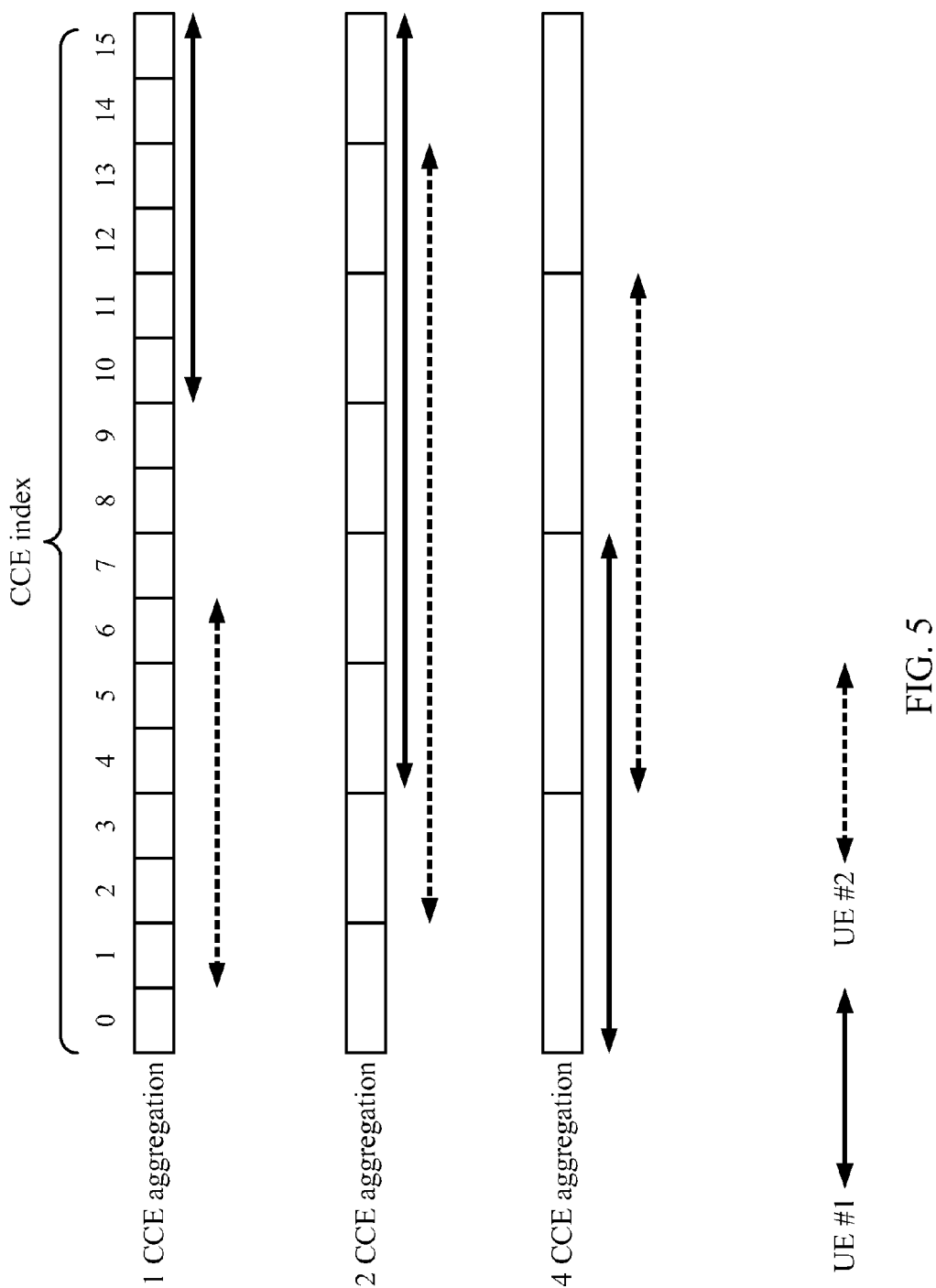
FIG. 5 is a schematic figure illustrating search space associated with different aggregation levels for various users, according to an aspect of the present disclosure.

FIG. 5 is a schematic figure illustrating search space associated with different aggregation levels for various users, according to an aspect of the present disclosure. UE specific search space associated with three aggregation levels 1, 2 and 4 for two different users UE #1 and UE #2 is illustrated in this figure. The search space for UE #1 for aggregation level 1 extends from CCE index 10 to CCE index 15, for aggregation level 2 the search space extends from CCE index 4 to CCE index 15, while for aggregation level 4 the search space extends from CCE index 0 to CCE index 7.

For some decoding candidates, there is no overlapping of the CCEs corresponding to different aggregation levels for UE #1. For instance, decoding candidate using CCE index 10 of aggregation level 1 is not overlapped with decoding candidate using CCE indices 4 and 5 of aggregation level 2. For some decoding candidates, there is overlapping CCEs corresponding to different aggregation levels for UE #1. For instance, decoding candidate using CCE index 10 of aggregation level 1 is overlapped with decoding candidate using CCE indices 10 and 11 of aggregation level 2, and share the same starting CCE index. Thus, the search space for aggregation level 2 may contain some part of search space of aggregation level 1 for UE #1. As a result, if the control channel PDCCH is transmitted on level 2, UE #1 may be able to decode the PDCCH using both level 1 and level 2.

The search space for aggregation level 1 of UE #2 spans from CCE index 1 to CCE index 6, the search space for aggregation level 2 spans from CCE index 2 to CCE index 13, while for aggregation level 4 the search space spans from CCE index 4 to CCE index 11. Thus, the search space for aggregation level 4 may contain some part of search space of aggregation level 2 for UE #2. As a result, if the control channel PDCCH is transmitted on level 4, UE #2 may be able to decode the PDCCH with both level 2 and level 4. As a result, the UE may be decoding one PDCCH more than once as illustrated for UE #2 in FIG. 5. The situation can arise when the UE decodes one PDCCH with different aggregation sizes due to overlapping of their search spaces.

According to certain aspects, both CRS-based and DM-RS (Demodulation Reference Signal)-based R-PDCCH demodulation may be supported. For DM-RS-based R-PDCCH demodulation, the DL grant and UL grant in a PRB pair may be for the same relay node (RN). In other words, no REs in such a PRB pair can be used for a different RN. On the other hand, for CRS-based R-PDCCH demodulation, two interleaving modes may be supported: (1) Rel-8-type REG-level interleaving and (2) no interleaving across R-PDCCHs within a PRB.

R-PDCCH search space design may be similar to that of Rel-8. In particular, CCE-based R-PDCCH may be supported. Regardless of how CCE is defined, the RN may have to perform blind decodes using multiple CCE levels to decide whether the RN receives R-PDCCH or not. For example, a CCE may be defined as one PRB or a fraction of PRB, or the Rel-8 definition—9 REGs constructing one CCE. However, the CCE may no longer be a size of 36 REs as in Rel-8. Depending on the R-PDCCH, the RN then decides whether the assigned R-PDSCH may have overlapped resources with R-PDCCH or not. If so, for the overlapped PRBs, the assigned R-PDSCH may only use the resources in the second slot.

A RN may successfully decode R-PDCCH with one or more aggregation levels. For instance, the DeNB (e.g., donor BS 302) may use CCE level n for R-PDCCH, and the RN may successfully decode R-PDCCH using CCE level set S. There may be no issue when set S may have only one member m=n. However, where set S may have only one member m≠n may be possible. Further, it may be possible for set S to have two or more members with at least one member m≠n. In such cases, the RN may be confused regarding which CCE levels the R-PDCCH may be using, and hence, potentially which PRB(s) the R-PDCCH are overlapped with R-PDSCH. Such confusion may result in incorrect multiplexing of R-PDCCH with R-PDSCH and impact the reception of R-PDSCH.

PDCCH for a UE may be transmitted using one of the PDCCH decoding candidates of aggregation level m. The search space of aggregation level m may overlap with one or more other aggregation levels, as described with reference to FIG. 5. For instance, the search space of aggregation level m may overlap with that of aggregation level n≠m. For a certain set of PDCCH sizes, successful PDCCH decoding may occur at the UE by using at least one of the decoding candidates of aggregation level n with a starting CCE index the same or different from the starting CCE index of the actual PDCCH transmission using aggregation level m. The case of the same starting CCE index may not be an issue in Rel-8 as only the starting CCE may be used for some other purpose in Rel-8 (e.g., the starting CCE index may be used for implicit derivation of ACK/NAK resource for PDSCH transmissions).

The set of PDCCH sizes causing potentially successful PDCCH decoding with two or more aggregation levels of distinct starting CCE indices may be referred to as ambiguous sizes. For an ambiguous PDCCH size, zero padding may be applied to make it a "non-ambiguous" size. With that, two or more CCE aggregation levels of distinct starting CCE indices may not practically result in the same successful PDCCH decoding.

Figure 6:
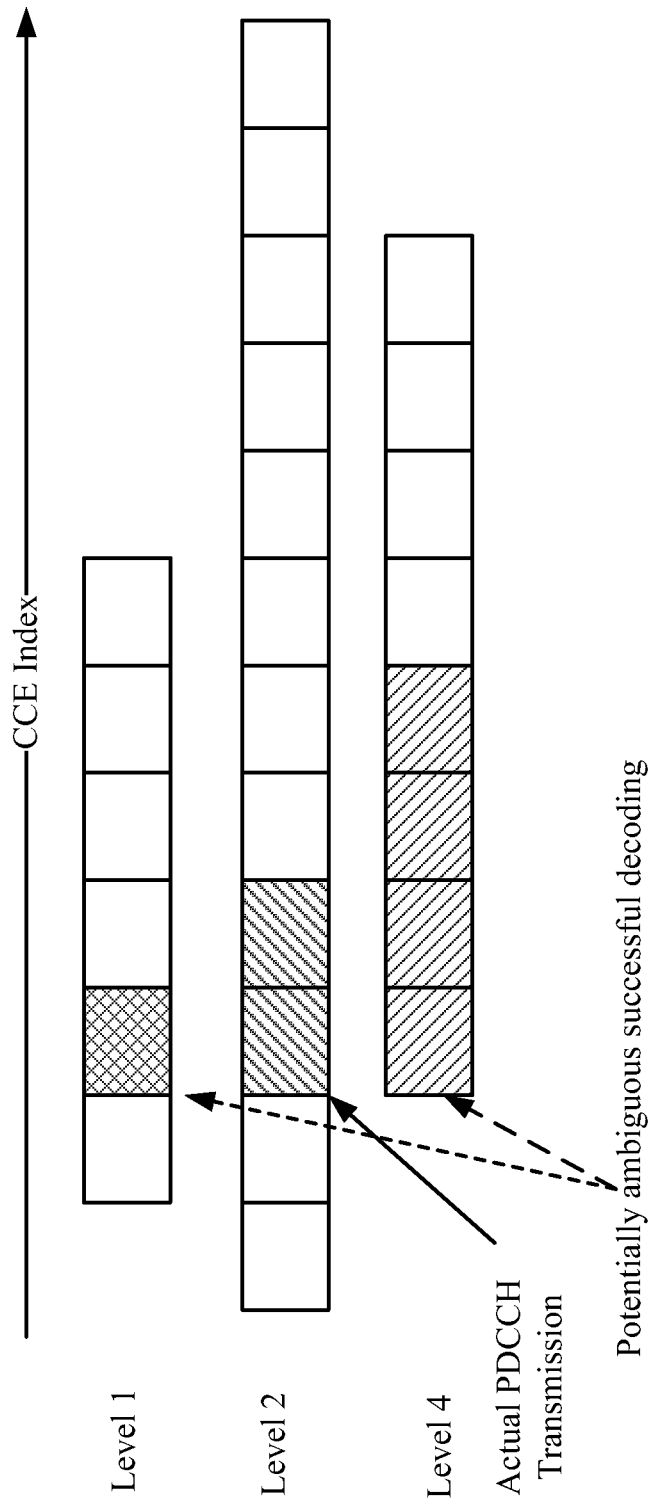
FIG. 6 illustrates ambiguous R-PDCCH decoding, according to an aspect of the present disclosure.

FIG. 6 illustrates ambiguous R-PDCCH decoding, according to an aspect of the present disclosure. It may be possible to have two or more CCEs levels of the same starting CCE index causing successful decoding, as illustrated in FIG. 6. When two or more search spaces are overlapped, R-PDCCH decoding candidates of different aggregation levels of the same starting CCE index may result in a successful R-PDCCH decoding, when actual R-PDCCH transmission may use only one of them. Such a possibility may result in confusion in the multiplexing of R-PDCCH and R-PDSCH. Therefore, embodiments of the present disclosure provide solutions to overcome this confusion, as will be described further herein.

For some embodiments, among the multiple CCE levels resulting in successful decoding of R-PDCCH, the RN may attempt R-PDSCH decoding assuming these multiple CCE levels (i.e., blind detection). In other words, for each CCE level, the RN may determine the resources utilized by R-PDSCH by excluding the overlapped PRBs used for R-PDCCH with the CCE level in the first slot, if any.

For some embodiments, if there are multiple CRC passes of multiple CCE levels, the RN may choose the lowest CCE, the highest CCE, or a fixed aggregation level (i.e., fixed CCE assumption). The chosen aggregation level may be higher layer signaled, and the RN may utilize this fact to reduce the number of blind decodings, as described above.

For some embodiments, for different aggregation levels, different rate matching algorithms may be used by shifting resource mappings by an aggregation level dependent offset (i.e., aggregation level dependent rate matching). This may be achieved by modifying a bit collection, selection and transmission. Therefore, if a DeNB transmits control information using a particular aggregation level, a RN may not be able to decode the control information using any other aggregation level.

For some embodiments, for different aggregation levels, an aggregation level dependent CRC mask may be applied. This may be achieved by scrambling the CRC bits by a sequence which is determined by the aggregation level (e.g., 1, 2, 4, or 8). The CRC bits may be calculated by the entire transport block for one PDCCH. In the receiver, before checking CRC for one aggregation level, a node may descramble the decoded bits first by the corresponding aggregation level dependent scrambling code.

For some embodiments, for different aggregation levels, an aggregation level dependent scrambling code may be applied (i.e., for different aggregation levels, apply a different scrambling code). Neither of these methods may increase the CRC false alarm rate. For some embodiments, an aggregation level dependent scrambling code may be applied by scrambling both the entire transport block and the corresponding CRC bits (CRC bits are calculated based on the entire transport block). The receiver may need to descramble the decoded bits before checking CRC. For some embodiments, an aggregation level dependent scrambling code may be applied by scrambling the bits after channel coding or rate matching. The receiver may need to descramble the received signal before decoding.

For some embodiments, a DeNB may include the aggregation level size in the control information. With four aggregation levels (e.g., 1, 2, 4, and 8), two bits may be sufficient for indicating the aggregation level size. The aggregation level size may be included for all DL grants. Further, it may be applied to UL grants and DL power control (Format 3/3A) to satisfy the requirement that Format 0/1A/3/3A may have to have the same size.

Ambiguous R-PDCCH decoding may arise when a R-PDCCH transmission using a R-PDCCH decoding candidate of aggregation level m has the same starting CCE index as at least another R-PDCCH decoding candidate of a different aggregation level n, and at least one of the two or more R-PDCCH decoding candidates overlaps (even partially) with the assigned R-PDSCH resource. In light of the above two conditions, restriction on the combination of R-PDCCH and R-PDSCH may be applied.

Figure 7:
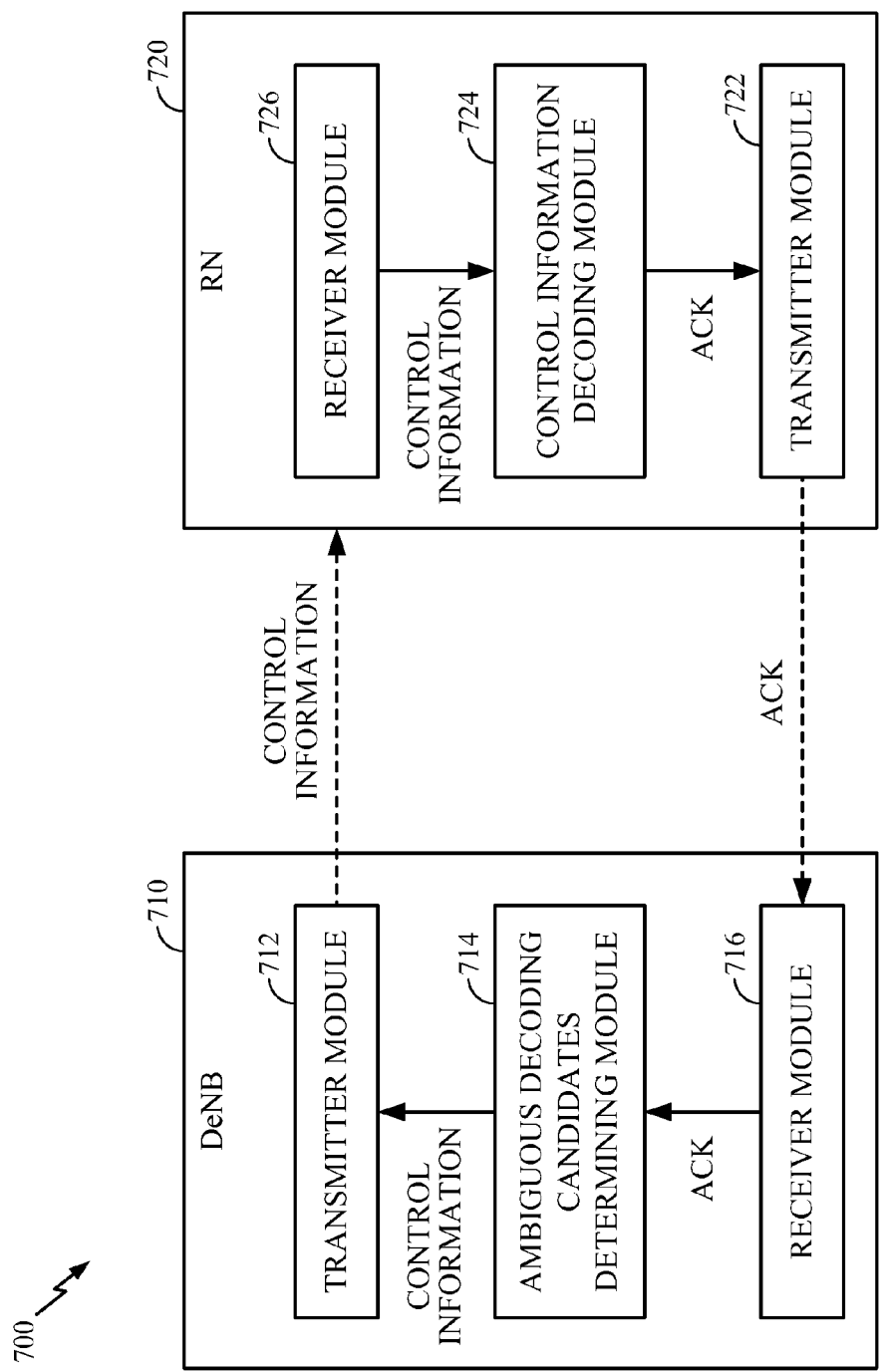
FIG. 7 illustrates an example system with a donor base station and a relay node, capable of handling ambiguous R-PDCCH decoding, according to an aspect of the present disclosure.

FIG. 7 illustrates an example system 700 with a DeNB 710 and a RN 720, capable of handling ambiguous R-PDCCH decoding, according to an aspect of the present disclosure. As illustrated, the DeNB 710 may include a ambiguous decoding candidates determining module 714, for determining a set of ambiguous decoding candidates across a set of decoding candidates for each of a plurality of aggregation levels, wherein a first decoding candidate of aggregation level m is in the set of ambiguous decoding candidates if there is at least a second decoding candidate of aggregation level n, wherein m is not equal to n, which has a same starting CCE index as the first decoding candidate. Control information (e.g., R-PDCCH) may be transmitted, via a transmitter module 712, to the RN 720, using the first decoding candidate of aggregation level m.

The RN 720 may receive the control information via a receiver module 726 and decode the control information via a control information decoding module 724. After receiving and decoding the control information, the RN 720 may acknowledge receipt of the control information via a transmitter module 722. The DeNB 710 may receive the acknowledgment via a receiver module 716.

Figure 8:
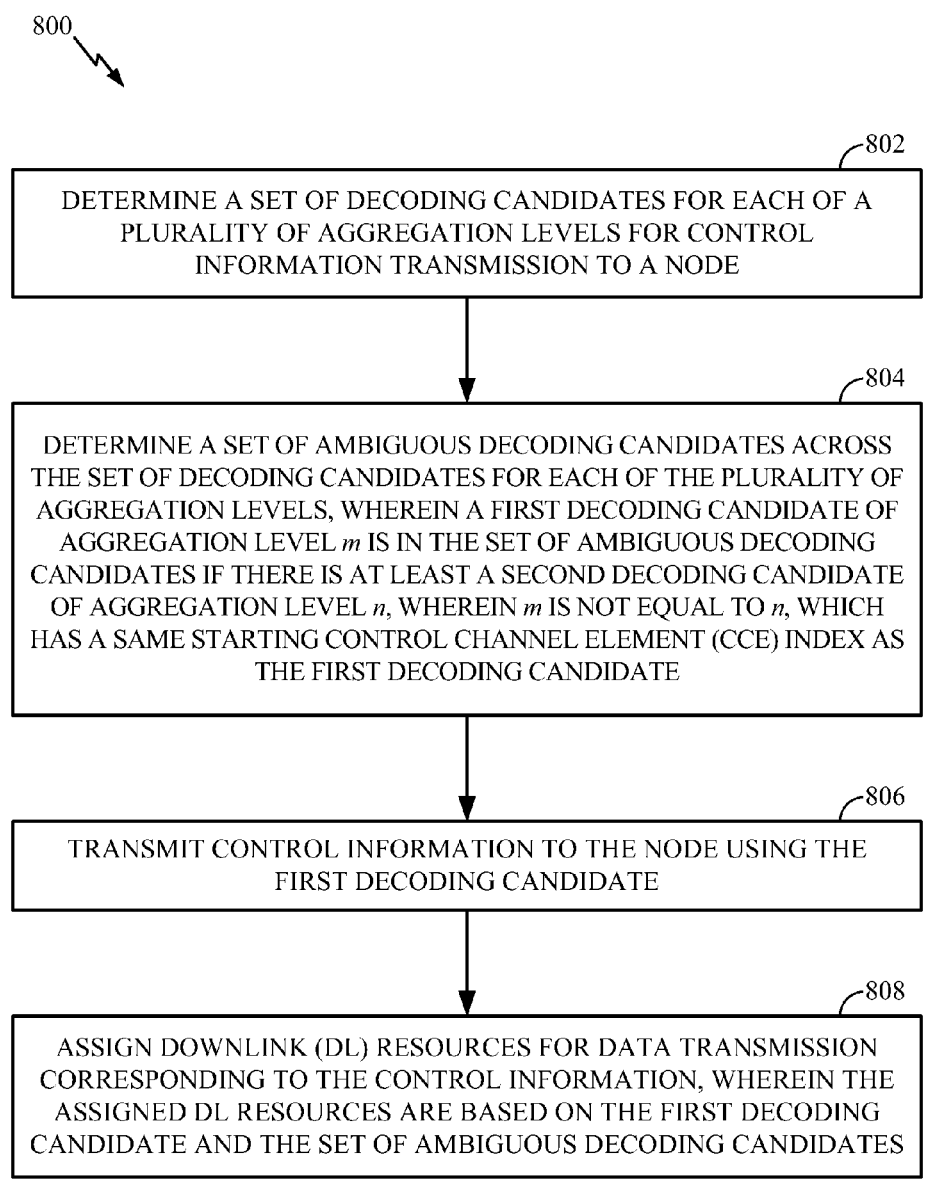
FIG. 8 illustrates example operations for determining a set of ambiguous decoding candidates, according to an aspect of the present disclosure.

FIG. 8 illustrates example operations 800 for determining a set of ambiguous decoding candidates, according to an aspect of the present disclosure. The operations 800 may be performed, for example, by a DeNB. At 802, the DeNB may determine a set of decoding candidates for each of a plurality of aggregation levels for control information transmission to a node. The node may be a half-duplex relay node.

At 804, the DeNB may determine a set of ambiguous decoding candidates across the set of decoding candidates for each of the plurality of aggregation levels, wherein a first decoding candidate of aggregation level m is in the set of ambiguous decoding candidates if there is at least a second decoding candidate of aggregation level n, wherein m is not equal to n, which has a same starting CCE index as the first decoding candidate.

At 806, the DeNB may transmit control information to the node using the first decoding candidate. The control information may comprise a R-PDCCH.

At 808, the DeNB may assign DL resources for data transmission corresponding to the control information, wherein the assigned DL resources are based on the first decoding candidate and the set of ambiguous decoding candidates. The DL resources may comprise a PDSCH for a relay node.

For some embodiments, the assigned DL resources may comprise all resources used by the first decoding candidate of aggregation level m for the control information transmission and may not contain at least some resources of the second decoding candidate of aggregation level n, wherein n is greater than m, and both the first decoding candidate and the second decoding candidate are in the set of ambiguous decoding candidates. For some embodiments, the assigned DL resources may not contain any resources of the first decoding candidate when the first decoding candidate is in the set of ambiguous decoding candidates.

Figure 9:
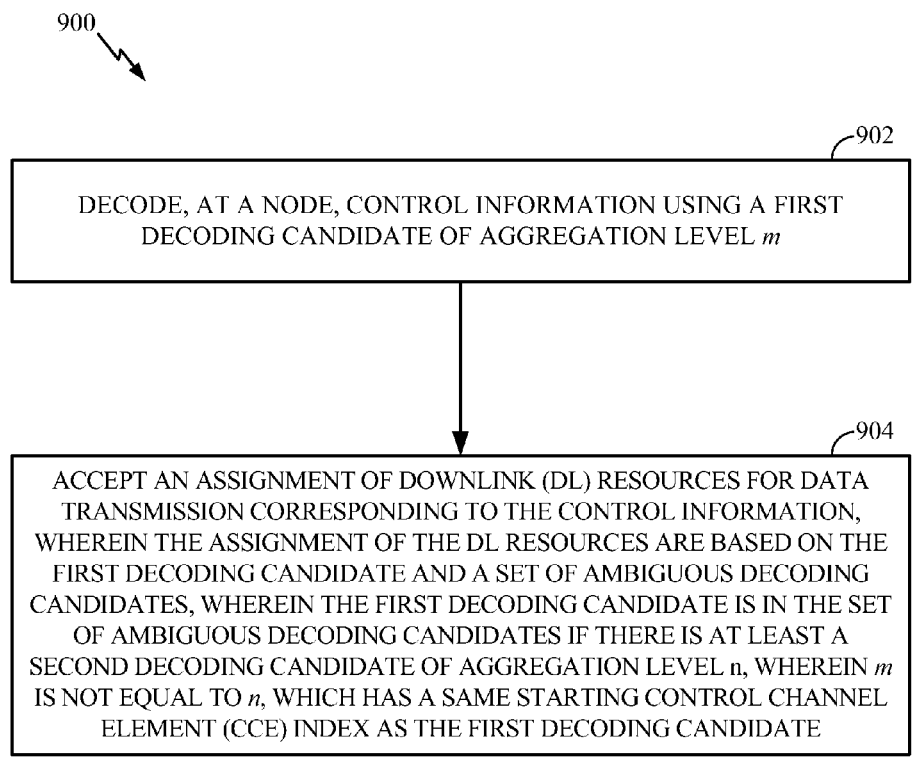
FIG. 9 illustrates example operations 900 decoding control information, according to an aspect of the present disclosure.

FIG. 9 illustrates example operations 900 for decoding control information, according to an aspect of the present disclosure. The operations 900 may be performed, for example, by a RN. At 902, the RN may decode control information using a first decoding candidate of aggregation level m.

At 904, the RN may accept an assignment of DL resources for data transmission corresponding to the control information, wherein the assignment of DL resources are based on the first decoding candidate and a set of ambiguous decoding candidates, wherein the first decoding candidate is in the set of ambiguous decoding candidates if there is at least a second decoding candidate of aggregation level n, wherein m is not equal to n, which has a same starting CCE index as the first decoding candidate. For some embodiments, the RN may decode the control information using at least the second decoding candidate of the aggregation level n.

For some embodiments, if a R-PDCCH transmission using a R-PDCCH decoding candidate of aggregation level m has the same starting CCE index as at least another R-PDCCH decoding candidate of a different aggregation level n, R-PDSCH may be restricted from overlapping with any R-PDCCH decoding candidates. Otherwise, R-PDSCH may be multiplexed with R-PDCCH in the same PRB pair, as will be discussed further herein. Such a restriction may be implicit or explicit. For example, a DeNB may try to obey the restriction as much as possible, but there may be no guarantee (i.e., implicit). However, such a restriction may be either explicitly enforced at the DeNB (never violating such restriction), or at the RN (e.g., if the combination of R-PDCCH and R-PDSCH does not follow the restriction, the RN may treat the assignment as an error event and discard the assignment).

For some embodiments, if a R-PDCCH transmission using a R-PDCCH decoding candidate of aggregation level m has the same starting CCE index as at least another R-PDCCH decoding candidate of a different aggregation level n, the assigned R-PDSCH resource may contain all the resources used by R-PDCCH, and may not fully contain the resource used by any ambiguous PDCCH decoding candidate(s) of higher aggregation level(s). From the RN perspective, among all the ambiguous PDCCH decoding candidates, the RN may choose the highest aggregation level among the ambiguous PDCCH decoding candidates for which all its resource is fully contained with R-PDSCH.

Figure 10A:
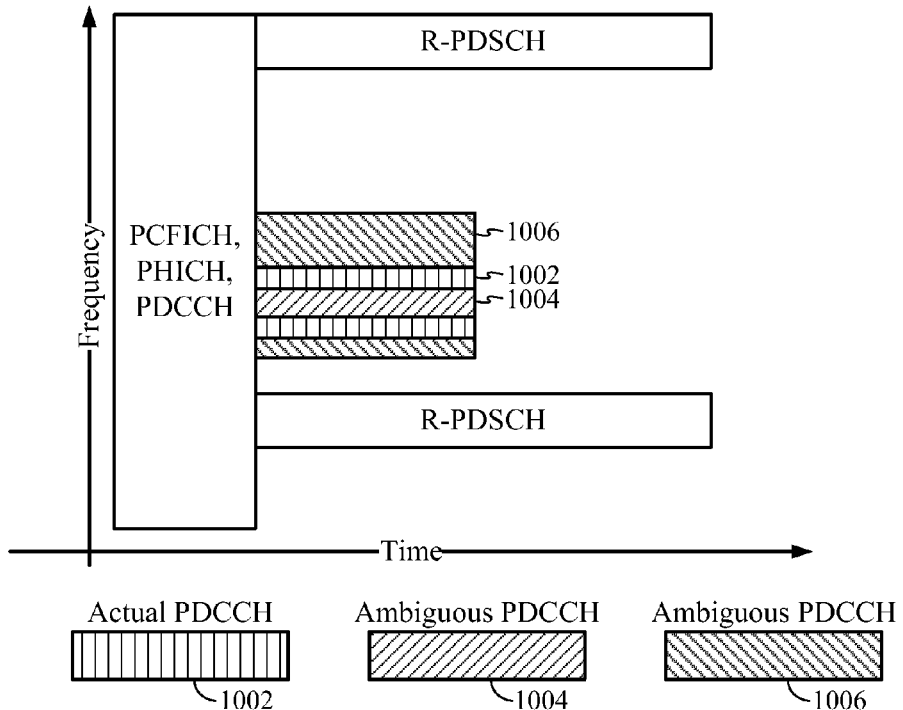
FIGS. 10A-B illustrate two possible scenarios in case of ambiguous PDCCHs, according to aspects of the present disclosure.
Figure 10B:
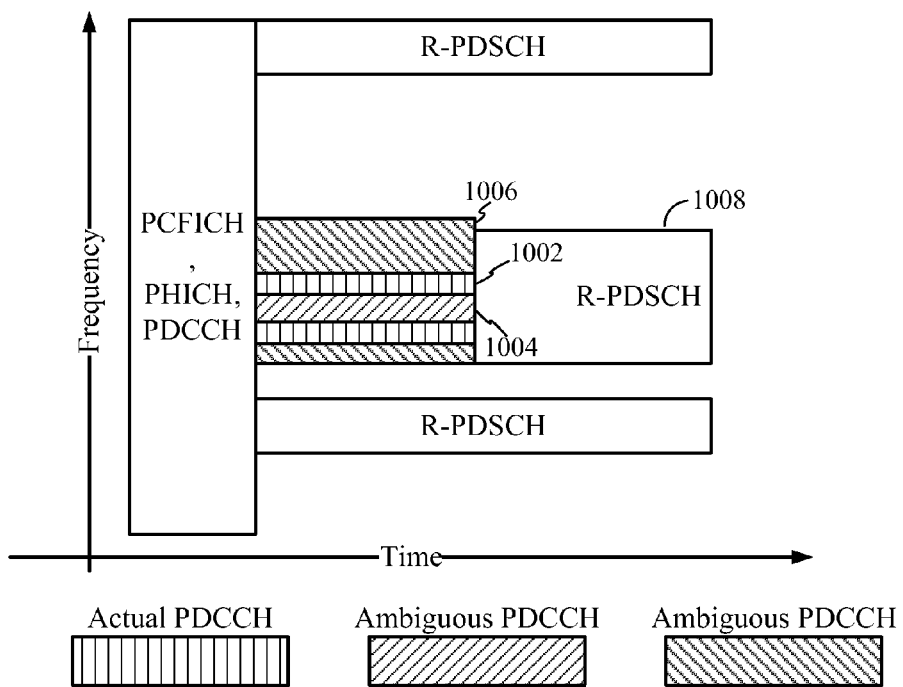

FIGS. 10A-B illustrate two possible scenarios in case of ambiguous PDCCHs, according to aspects of the present disclosure. Referring to FIG. 10A, there is no multiplexing of R-PDCCH (of all possible ambiguous PDCCH decoding candidates) with R-PDSCH. However, referring to FIG. 10B, multiplexing of R-PDCCH and R-PDSCH may be allowed, but R-PDSCH may fully contain the resource of the correct PDCCH decoding candidate, and may not fully contain the resource by ambiguous PDCCH decoding candidate(s) of higher aggregation level.

FIGS. 10A-B illustrate three ambiguous PDCCH decoding candidates, where candidate 1002 may represent the correct one used for the actual PDCCH transmission, while candidates 1004, 1006 may represent potential ambiguous PDCCH decoding candidates for the RN. Candidate 1006 (of a higher aggregation level) may fully contain candidate 1002 (the actual level), while candidate 1002 may fully contain candidate 1004 (of a lower level).

Referring to FIG. 10B, R-PDSCH 1008 may completely contain candidate 1002 (the correct candidate), and may not fully contain the additional resource used by candidate 1006 (of a higher aggregation level). When the RN attempts to decode the R-PDCCH, the RN may successfully decode all the three candidates 1002, 1004, 1006. The RN may then compare the R-PDCCH resources with the assigned PDSCH 1008 resource. Candidate 1004 is fully contained by R-PDSCH 1008, but the additional resource used by candidate 1002 overlaps with R-PDSCH as well. Candidate 1002 is fully contained by R-PDSCH, and the additional resource used by candidate 1006 is not fully contained by R-PDSCH 1008. Candidate 1006 overlaps with R-PDSCH 1008, but is not fully contained within R-PDSCH 1008. As a result, the RN may determine that candidate 1002 is the right decoding candidate, and the R-PDSCH may then be decoded appropriately.

From DeNB perspective, the DeNB may obey the rules/restrictions if a PDCCH decoding candidate for PDCCH transmission has ambiguity. For some embodiments, the DeNB may attempt to select a PDCCH decoding candidate without any ambiguity.

Figure 11:
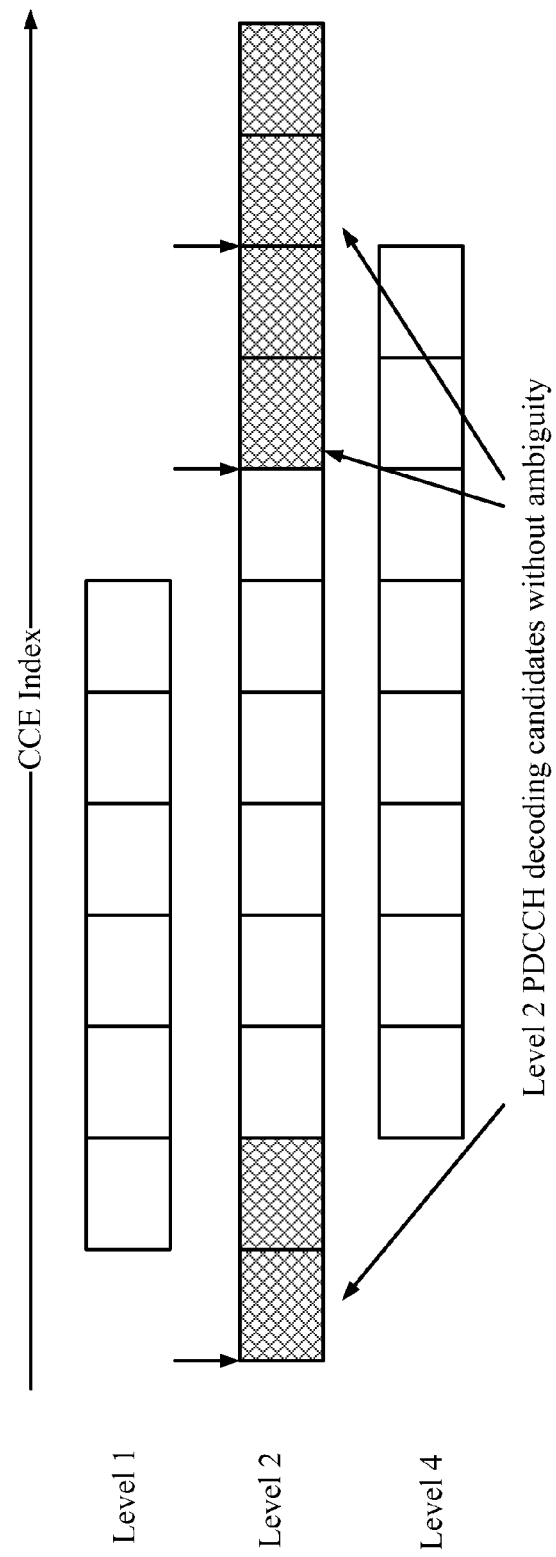
FIG. 11 illustrates level 2 PDCCH decoding candidates without any ambiguity, according to an aspect of the present disclosure.

FIG. 11 illustrates level 2 PDCCH decoding candidates without any ambiguity, according to an aspect of the present disclosure. For some embodiments, the DeNB may attempt to select one of the three PDCCH decoding candidates without any ambiguity for R-PDCCH transmission, without restriction on how R-PDCCH and R-PDSCH is multiplexed.

As described above, R-PDCCH ambiguity may occur when two or more R-PDCCH decoding candidates with the same starting CCE index may be successfully decoded. For some embodiments, an aggregation level dependent RE mapping scheme may be designed such that R-PDCCH decoding candidates with the same starting CCE index of different aggregation levels for a UE may not be successfully decoded at the same time.

For some embodiments, for DL grants, there may be four symbols available for R-PDCCH for the normal CP case, denoted by s1, s2, s3, s4. This is because among the seven symbols available in the first slot, the first three symbols may be statically reserved. The RE mapping may be done in the following order:

Aggregation level 1: s1→s2→s3→s4
Aggregation level 2: s2→s3→s4→s1
Aggregation level 4: s3→s4→s1→s2
Aggregation level 8: s4→s1→s2→s3

Many other variations may be possible, as long as the RE mapping is aggregation level specific, such that there may be no R-PDCCH ambiguity.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

For example, means for transmitting may comprise a transmitter (e.g., a transmitter 222) and/or an antenna 224 of the transmitter system 210 or a transmitter (e.g., a transmitter 254) and/or an antenna 252 of the receiver system 250 illustrated in FIG. 2. Means for receiving may comprise a receiver (e.g., a receiver 254) and/or an antenna 252 of the receiver system 250 or a receiver (e.g., a receiver 222) and/or an antenna 224 of the transmitter system 210 illustrated in FIG. 2. Means for processing, means for determining, means for assigning, or means for decoding may comprise a processing system, which may include at least one processor, such as the RX data processor 260, the processor 270, and/or the TX data processor 238 of the receiver system 250 or the RX data processor 242, the processor 230, and/or the TX data processor 214 of the transmitter system 210 illustrated in FIG. 2.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
   determining a set of decoding candidates for each of a plurality of aggregation levels for control information transmission to a node;
   determining a set of ambiguous decoding candidates across the set of decoding candidates for each of the plurality of aggregation levels, wherein a first decoding candidate of aggregation level m is in the set of ambiguous decoding candidates if there is at least a second decoding candidate of aggregation level n, wherein m is not equal to n, which has a same starting control channel element (CCE) index as the first decoding candidate;
   transmitting control information to the node using the first decoding candidate; and
   assigning downlink (DL) resources for data transmission corresponding to the control information, wherein the assigned DL resources are based on the first decoding candidate and the set of ambiguous decoding candidates, wherein the first decoding candidate is fully contained in the assigned DL resources and at least a portion of the second decoding candidate is outside the assigned DL resources.

2. The method of claim 1, wherein the node is a half-duplex relay node.

3. The method of claim 1, wherein the control information comprises a relay physical downlink control channel (R-PDCCH).

4. The method of claim 1, wherein the DL resources comprise a physical downlink shared channel (PDSCH) for a relay node.

5. The method of claim 1, wherein n is greater than m, and both the first decoding candidate and the second decoding candidate are in the set of ambiguous decoding candidates.

6. The method of claim 1, wherein the assigned DL resources do not contain any resources of the first decoding candidate when the first decoding candidate is in the set of ambiguous decoding candidates.

7. The method of claim 1, wherein the second decoding candidate is also in the set of ambiguous decoding candidates.

8. The method of claim 1, wherein there are four aggregation levels: 1, 2, 4 and 8.

9. The method of claim 1, wherein each aggregation level comprises one or more CCEs.

10. The method of claim 9, wherein each CCE comprises a physical resource block.

11. The method of claim 9, wherein each CCE comprises nine resource element groups (REGs), and the REGs belong to two or more physical resource blocks.

12. The method of claim 1, wherein the set of decoding candidates are located in a first slot of a subframe.

13. An apparatus for wireless communications, comprising:
means for determining a set of decoding candidates for each of a plurality of aggregation levels for control information transmission to a node;
means for determining a set of ambiguous decoding candidates across the set of decoding candidates for each of the plurality of aggregation levels, wherein a first decoding candidate of aggregation level m is in the set of ambiguous decoding candidates if there is at least a second decoding candidate of aggregation level n, wherein m is not equal to n, which has a same starting control channel element (CCE) index as the first decoding candidate;
means for transmitting control information to the node using the first decoding candidate; and
means for assigning downlink (DL) resources for data transmission corresponding to the control information, wherein the assigned DL resources are based on the first decoding candidate and the set of ambiguous decoding candidates, wherein the first decoding candidate is fully contained in the assigned DL resources and at least a portion of the second decoding candidate is outside the assigned DL resources.

14. The apparatus of claim 13, wherein the node is a half-duplex relay node.

15. The apparatus of claim 13, wherein the control information comprises a relay physical downlink control channel (R-PDCCH).

16. The apparatus of claim 13, wherein the DL resources comprise a physical downlink shared channel (PDSCH) for a relay node.

17. The apparatus of claim 13, wherein n is greater than m, and both the first decoding candidate and the second decoding candidate are in the set of ambiguous decoding candidates.

18. The apparatus of claim 13, wherein the assigned DL resources do not contain any resources of the first decoding candidate when the first decoding candidate is in the set of ambiguous decoding candidates.

19. The apparatus of claim 13, wherein the second decoding candidate is also in the set of ambiguous decoding candidates.

20. The apparatus of claim 13, wherein there are four aggregation levels: 1, 2, 4 and 8.

21. The apparatus of claim 13, wherein each aggregation level comprises one or more CCEs.

22. The apparatus of claim 21, wherein each CCE comprises a physical resource block.

23. The apparatus of claim 21, wherein each CCE comprises nine resource element groups (REGs), and the REGs belong to two or more physical resource blocks.

24. The apparatus of claim 13, wherein the set of decoding candidates are located in a first slot of a subframe.

25. An apparatus for wireless communications, comprising:
at least one processor configured to:
determine a set of decoding candidates for each of a plurality of aggregation levels for control information transmission to a node;
determine a set of ambiguous decoding candidates across the set of decoding candidates for each of the plurality of aggregation levels, wherein a first decoding candidate of aggregation level m is in the set of ambiguous decoding candidates if there is at least a second decoding candidate of aggregation level n, wherein m is not equal to n, which has a same starting control channel element (CCE) index as the first decoding candidate;
transmit control information to the node using the first decoding candidate; and
assign downlink (DL) resources for data transmission corresponding to the control information, wherein the assigned DL resources are based on the first decoding candidate and the set of ambiguous decoding candidates, wherein the first decoding candidate is fully contained in the assigned DL resources and at least a portion of the second decoding candidate is outside the assigned DL resources; and
a memory coupled with the at least one processor.

26. The apparatus of claim 25, wherein n is greater than m, and both the first decoding candidate and the second decoding candidate are in the set of ambiguous decoding candidates.

27. The apparatus of claim 25, wherein the assigned DL resources do not contain any resources of the first decoding candidate when the first decoding candidate is in the set of ambiguous decoding candidates.

28. The apparatus of claim 25, wherein the second decoding candidate is also in the set of ambiguous decoding candidates.

29. A computer program product for wireless communications, comprising:
a non-transitory computer readable medium having instructions stored thereon, the instructions executable by one or more processors for:
determining a set of decoding candidates for each of a plurality of aggregation levels for control information transmission to a node;
determining a set of ambiguous decoding candidates across the set of decoding candidates for each of the plurality of aggregation levels, wherein a first decoding candidate of aggregation level m is in the set of ambiguous decoding candidates if there is at least a second decoding candidate of aggregation level n, wherein m is not equal to n, which has a same starting control channel element (CCE) index as the first decoding candidate;
transmitting control information to the node using the first decoding candidate; and
assigning downlink (DL) resources for data transmission corresponding to the control information, wherein the assigned DL resources are based on the first decoding candidate and the set of ambiguous decoding candidates, wherein the first decoding candidate is fully contained in the assigned DL resources and at least a portion of the second decoding candidate is outside the assigned DL resources.

30. The computer program product of claim 29, wherein n is greater than m, and both the first decoding candidate and the second decoding candidate are in the set of ambiguous decoding candidates.

31. The computer program product of claim 29, wherein the assigned DL resources do not contain any resources of the first decoding candidate when the first decoding candidate is in the set of ambiguous decoding candidates.

32. The computer program product of claim 29, wherein the second decoding candidate is also in the set of ambiguous decoding candidates.

33. A method for wireless communications, comprising:
decoding, at a node, control information using a first decoding candidate of aggregation level m; and
accepting an assignment of downlink (DL) resources for data transmission corresponding to the control information, wherein the assignment of DL resources are based on the first decoding candidate and a set of ambiguous decoding candidates, wherein the first decoding candidate is in the set of ambiguous decoding candidates if there is at least a second decoding candidate of aggregation level n, wherein m is not equal to n, which has a same starting control channel element (CCE) index as the first decoding candidate, wherein the first decoding candidate is fully contained in the assignment of DL resources and at least a portion of the second decoding candidate is outside the assignment of DL resources.

34. The method of claim 33, wherein the node is a half-duplex relay node.

35. The method of claim 33, wherein the control information comprises a relay physical downlink control channel (R-PDCCH).

36. The method of claim 33, wherein the DL resources comprise a physical downlink shared channel (PDSCH) for a relay node.

37. The method of claim 33, further comprising:
decoding the control information using at least the second decoding candidate of the aggregation level n.

38. The method of claim 33, wherein n is greater than m, and both the first decoding candidate and the second decoding candidate are in the set of ambiguous decoding candidates.

39. The method of claim 33, wherein the assignment of DL resources do not contain any resources of the first decoding candidate when the first decoding candidate is in the set of ambiguous decoding candidates.

40. The method of claim 33, wherein the second decoding candidate is also in the set of ambiguous decoding candidates.

41. The method of claim 33, wherein there are four aggregation levels: 1, 2, 4 and 8.

42. The method of claim 33, wherein each aggregation level comprises one or more CCEs.

43. The method of claim 42, wherein each CCE comprises a physical resource block.

44. The method of claim 42, wherein each CCE comprises nine resource element groups (REGs), and the REGs belong to two or more physical resource blocks.

45. The method of claim 33, wherein the set of decoding candidates are located in a first slot of a subframe.

46. An apparatus for wireless communications, comprising:
means for decoding, at a node, control information using a first decoding candidate of aggregation level m; and
means for accepting an assignment of downlink (DL) resources for data transmission corresponding to the control information, wherein the assignment of DL resources are based on the first decoding candidate and a set of ambiguous decoding candidates, wherein the first decoding candidate is in the set of ambiguous decoding candidates if there is at least a second decoding candidate of aggregation level n, wherein m is not equal to n, which has a same starting control channel element (CCE) index as the first decoding candidate, wherein the first decoding candidate is fully contained in the assignment of DL resources and at least a portion of the second decoding candidate is outside the assignment of DL resources.

47. The apparatus of claim 46, wherein the node is a half-duplex relay node.

48. The apparatus of claim 46, wherein the control information comprises a relay physical downlink control channel (R-PDCCH).

49. The apparatus of claim 46, wherein the DL resources comprise a physical downlink shared channel (PDSCH) for a relay node.

50. The apparatus of claim 46, further comprising:
means for decoding the control information using at least the second decoding candidate of the aggregation level n.

51. The apparatus of claim 46, wherein n is greater than m, and both the first decoding candidate and the second decoding candidate are in the set of ambiguous decoding candidates.

52. The apparatus of claim 46, wherein the assignment of DL resources do not contain any resources of the first decoding candidate when the first decoding candidate is in the set of ambiguous decoding candidates.

53. The apparatus of claim 46, wherein the second decoding candidate is also in the set of ambiguous decoding candidates.

54. The apparatus of claim 46, wherein there are four aggregation levels: 1, 2, 4 and 8.

55. The apparatus of claim 46, wherein each aggregation level comprises one or more CCEs.

56. The apparatus of claim 55, wherein each CCE comprises a physical resource block.

57. The apparatus of claim 55, wherein each CCE comprises nine resource element groups (REGs), and the REGs belong to two or more physical resource blocks.

58. The apparatus of claim 46, wherein the set of decoding candidates are located in a first slot of a subframe.

59. An apparatus for wireless communications, comprising:
at least one processor configured to:
decode, at a node, control information using a first decoding candidate of aggregation level m; and
accept an assignment of downlink (DL) resources for data transmission corresponding to the control information, wherein the assignment of DL resources are based on the first decoding candidate and a set of ambiguous decoding candidates, wherein the first decoding candidate is in the set of ambiguous decoding candidates if there is at least a second decoding candidate of aggregation level n, wherein m is not equal to n, which has a same starting control channel element (CCE) index as the first decoding candidate, wherein the first decoding candidate is fully contained in the assignment of DL resources and at least a portion of the second decoding candidate is outside the assignment of DL resources; and a memory coupled with the at least one processor.

60. The apparatus of claim 59, wherein the at least one processor is configured to:

decode the control information using at least the second decoding candidate of the aggregation level n.

61. The apparatus of claim 59, wherein n is greater than m, and both the first decoding candidate and the second decoding candidate are in the set of ambiguous decoding candidates.

62. The apparatus of claim 59, wherein the assignment of DL resources do not contain any resources of the first decoding candidate when the first decoding candidate is in the set of ambiguous decoding candidates.

63. A computer program product for wireless communications, comprising:

a non-transitory computer readable medium having instructions stored thereon, the instructions executable by one or more processors for:

decoding, at a node, control information using a first decoding candidate of aggregation level m; and accepting an assignment of downlink (DL) resources for data transmission corresponding to the control information, wherein the assignment of DL resources are based on the first decoding candidate and a set of ambiguous decoding candidates, wherein the first decoding candidate is in the set of ambiguous decoding candidates if there is at least a second decoding candidate of aggregation level n, wherein m is not equal to n, which has a same starting control channel element (CCE) index as the first decoding candidate, wherein the first decoding candidate is fully contained in the assignment of DL resources and at least a portion of the second decoding candidate is outside the assignment of DL resources.

64. The computer program product of claim 63, further comprising:

decoding the control information using at least the second decoding candidate of the aggregation level n.

65. The computer program product of claim 63, wherein n is greater than m, and both the first decoding candidate and the second decoding candidate are in the set of ambiguous decoding candidates.

66. The computer program product of claim 63, wherein the assignment of DL resources do not contain any resources of the first decoding candidate when the first decoding candidate is in the set of ambiguous decoding candidates.

* * * * *